(12) United States Patent
Ying et al.

(10) Patent No.: US 12,368,967 B2
(45) Date of Patent: Jul. 22, 2025

(54) DISTRIBUTED IMAGE SIGNAL PROCESSOR (ISP) SYSTEM FOR A HEAD-MOUNTED DEVICE

(71) Applicant: Meta Platforms Technologies, LLC, Menlo Park, CA (US)

(72) Inventors: Zhenqiang Ying, Sunnyvale, CA (US); Hao Xie, Sunnyvale, CA (US); Sung Ho Hong, San Jose, CA (US); Yazhu Ling, San Jose, CA (US); Jiangtao Kuang, San Jose, CA (US); Yuh-Lin Eugene Chang, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 178 days.

(21) Appl. No.: 18/118,991

(22) Filed: Mar. 8, 2023

(65) Prior Publication Data
US 2024/0305900 A1    Sep. 12, 2024

(51) Int. Cl.
*H04N 23/84* (2023.01)
*H04N 7/18* (2006.01)

(52) U.S. Cl.
CPC ............. *H04N 23/84* (2023.01); *H04N 7/183* (2013.01)

(58) Field of Classification Search
CPC ........ G02B 27/0172; G02B 2027/0138; G02B 2027/014; H04N 23/85; H04N 7/183; H04N 23/84
See application file for complete search history.

(56) References Cited

U.S. PATENT DOCUMENTS

| 2009/0109241 | A1* | 4/2009 | Tsujimoto | G09G 5/377 345/633 |
| 2013/0004071 | A1* | 1/2013 | Chang | G06F 1/3287 382/167 |
| 2020/0151451 | A1 | 5/2020 | Lee et al. | |
| 2021/0174123 | A1* | 6/2021 | Lerner | G06T 5/20 |

FOREIGN PATENT DOCUMENTS

IE    S86537 B2    5/2015

OTHER PUBLICATIONS

Office Action mailed May 6, 2025 for European Application No. 24155123.3, filed Jan. 31, 2024, 5 pages.

* cited by examiner

*Primary Examiner* — Yuzhen Shen
(74) *Attorney, Agent, or Firm* — Freestone Intellectual Property Law PLLC; Aaron J. Visbeek

(57) ABSTRACT

A distributed image signal processing (ISP) system for a head-mounted device reduces the power load on the battery of the head-mounted device. The distributed ISP system includes a Bayer image processing engine, an RGB image processing engine, and a YUV image processing engine. The Bayer image processing engine is operated by, for example, processing logic of the head-mounted device. The Bayer image processing engine provides Bayer image data from raw image data. The YUV image processing engine is operated by, for example, processing logic of a (companion) computing device (e.g., a phone, tablet, laptop, compute puck, personal computer). The computing device is communicatively coupled (e.g., wired or wirelessly) to the head-mounted device to receive image data. The RGB image processing engine may be operated by the head-mounted device or the computing device.

19 Claims, 9 Drawing Sheets

DISTRIBUTED IMAGE SIGNAL PROCESSOR (ISP) SYSTEM FOR A HEAD-MOUNTED DEVICE

TECHNICAL FIELD

This disclosure relates generally to image processing, and in particular to distributed image signal processing.

BACKGROUND INFORMATION

Head-mounted displays (HMDs) are prolific and enable users to immerse themselves into digital worlds and/or mixed reality experiences. As HMDs become increasingly popular for extended use (e.g., the entire day), battery life and battery life management is a hurdle that needs to be overcome to enable HMD extended operation.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
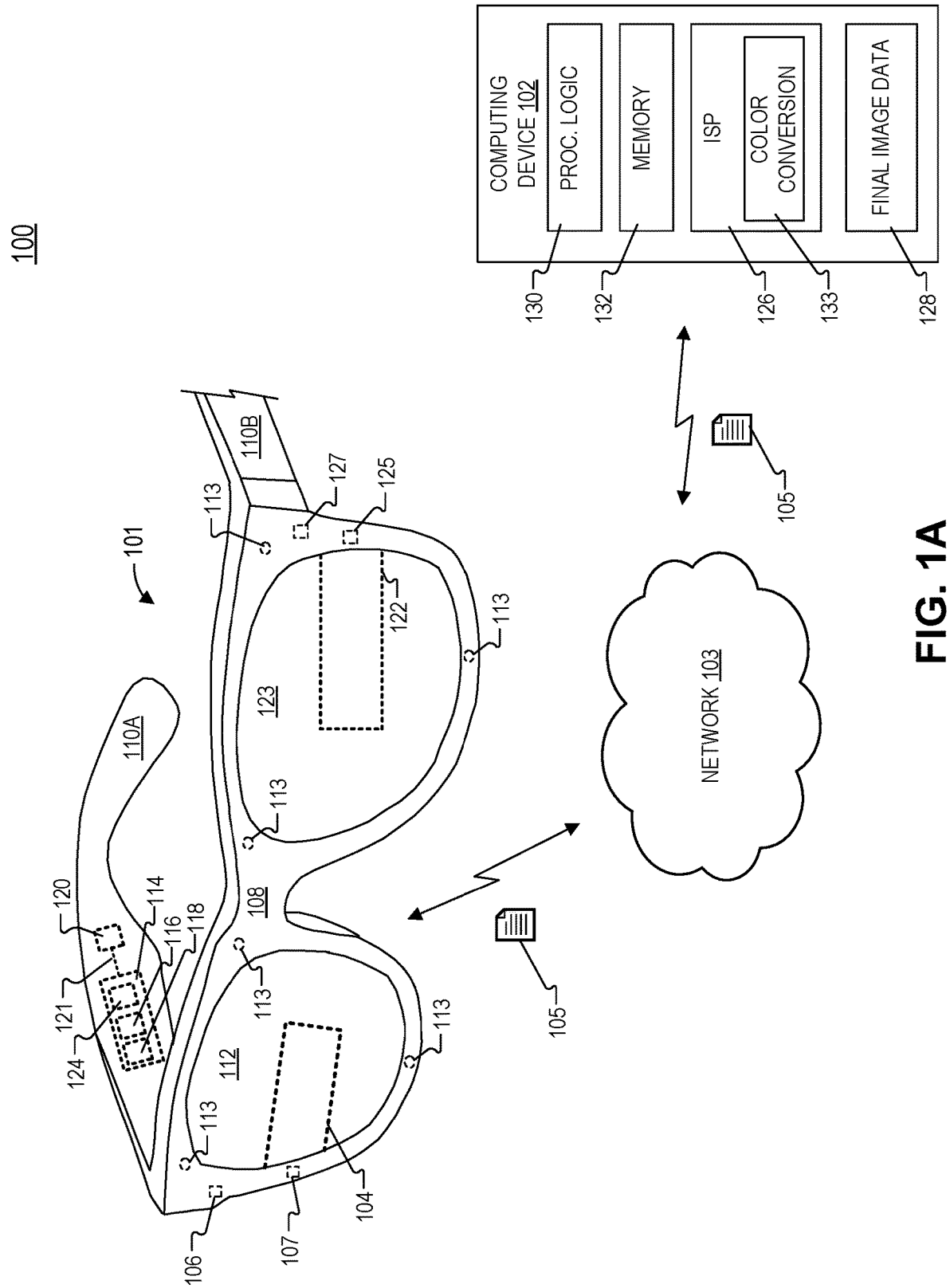
FIGS. 1A, 1B, 1C, and 1D illustrate example diagrams of distributed image signal processor (ISP) systems, in accordance with aspects of the disclosure.

Embodiments of a distributed image signal processor (ISP) system are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 μm.

Head-mounted devices, such as augmented reality (AR) glasses can use light-weight batteries that have power levels that may be rapidly depleted under heavy processing operations. An example of heavy processing operations include image signal processor (ISP) operations. An ISP may be configured to convert raw image data into RGB or YUV images. However, products like smartphones, tablets, laptops and other computing devices have a power budget that can be significantly higher (e.g., hundreds of milliwatts). The disclosed distributed ISP pipeline and architecture may improve power consumption of head-mounted devices.

Embodiments of the disclosure include distributed ISP systems and methods that are configured to extend battery life (e.g., duration of operation) of a head-mounted device. A distributed ISP system may include a head-mounted device communicatively coupled to a (companion) computing device, to perform distributed ISP operations. The head-mounted device may include a first ISP, and the computing device may include a second ISP. ISP operations include receiving raw image data from an image sensor, converting the raw image data to processed Bayer image data, converting the processed Bayer image data into YUV (luma, blue, red projection) image data, and converting the YUV image data into final (YUV) image data. The first ISP may be configured to perform partial ISP operations and may be configured to transmit the processed image data to the computing device for further ISP processing. For example, the first ISP may be configured to convert raw image data into processed Bayer image data, may be configured to convert the processed Bayer image data into YUV image data, and may be configured to transmit the YUV image data to the second ISP (e.g., the computing device) for conversion into final image data. As another example, the first ISP may be configured to convert raw image data into processed Bayer image data, and may be configured to transmit the processed Bayer image data to the second ISP (e.g., the computing device) for conversion into YUV image data and then into final image data. The final image data may then be displayed, image or video encoded, and/or sent back to the head-mounted device for further use. As another example, the first ISP may be configured to perform statistical processing (e.g., partial Bayer processing) of the raw image data and may be configured to transmit the raw image data to the second ISP for conversion into processed Bayer image data, YUV image data, and then into final image data. The final image data may then be displayed, image or video encoded, and/or sent back to the head-mounted device for further use.

The head-mounted device may be configured to distribute ISP operations to the computing device based on one or more events, in accordance with aspects of the disclosure. For example, the head-mounted device may be configured to monitor a voltage level or power level of a battery and may be configured to at least partially distribute ISP operations to the computing device to reduce the load on the battery. Reducing the load of the battery may extend the duration that head-mounted device may operate between battery charges. As another example, the head-mounted device may be configured to check for an established connected (e.g., over a network) to the computing device. The head-mounted device may be configured to distribute at least some (or nearly all) of the ISP operations to the computing device while a connection (e.g., wired or wireless) is established between the head-mounted device and the computing device, for example. As another example, the head-mounted device may be configured to determine whether a particular application or type of application is being operated (e.g., video conferencing, lowlight imaging, etc.). If a particular application or type of application is running, the head-mounted device may be configured to distribute at least some of the ISP operations.

The systems and methods of distributing ISP operations that are described in this disclosure may enable improvements in battery life for head-mounted devices, allowing the head-mounted devices to be more capable of extended use (e.g., through an entire day) prior to recharge. These and other embodiments are described in more detail in connection with FIGS. 1A-4.

Figure 1B:
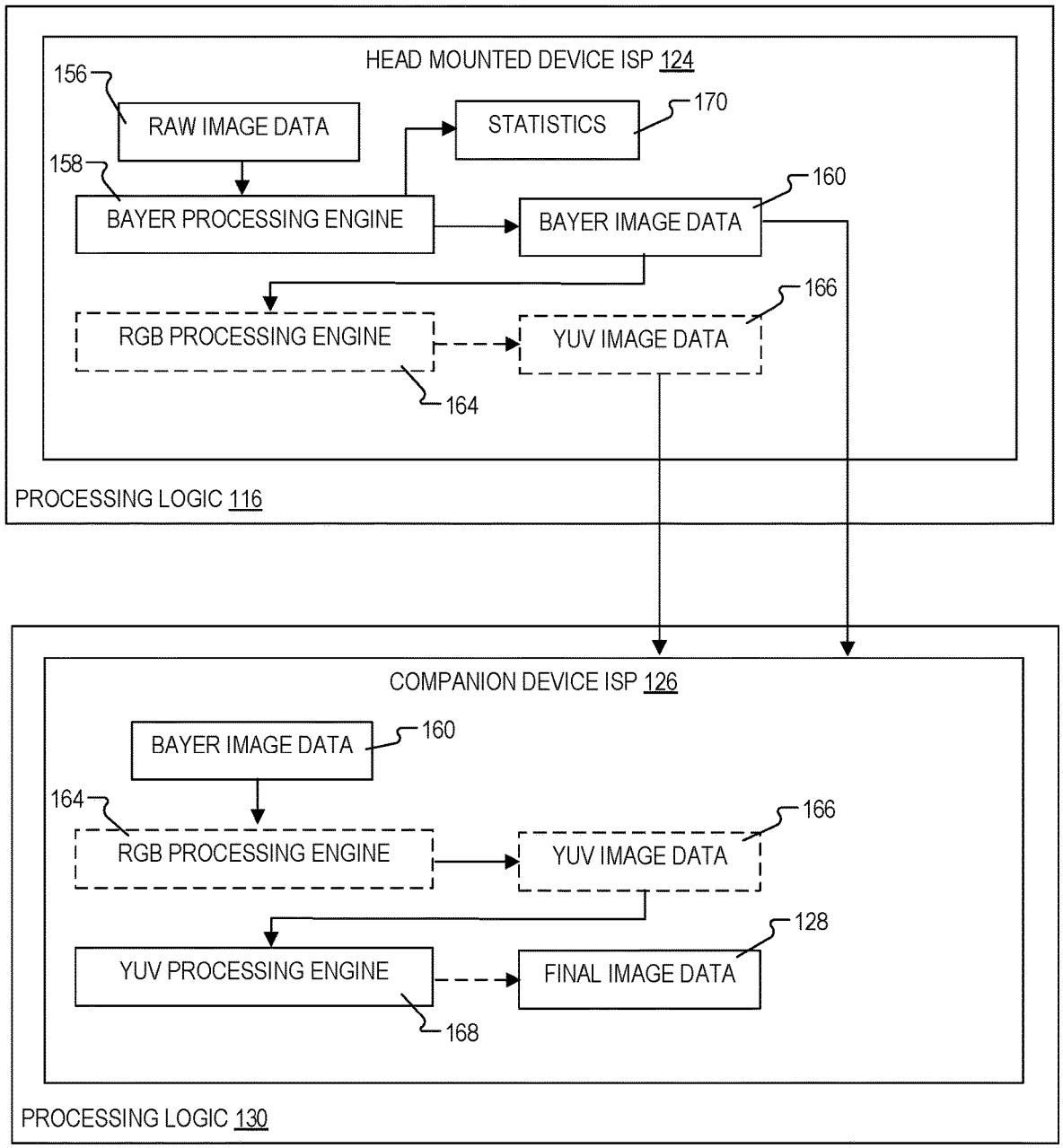
Figure 1C:
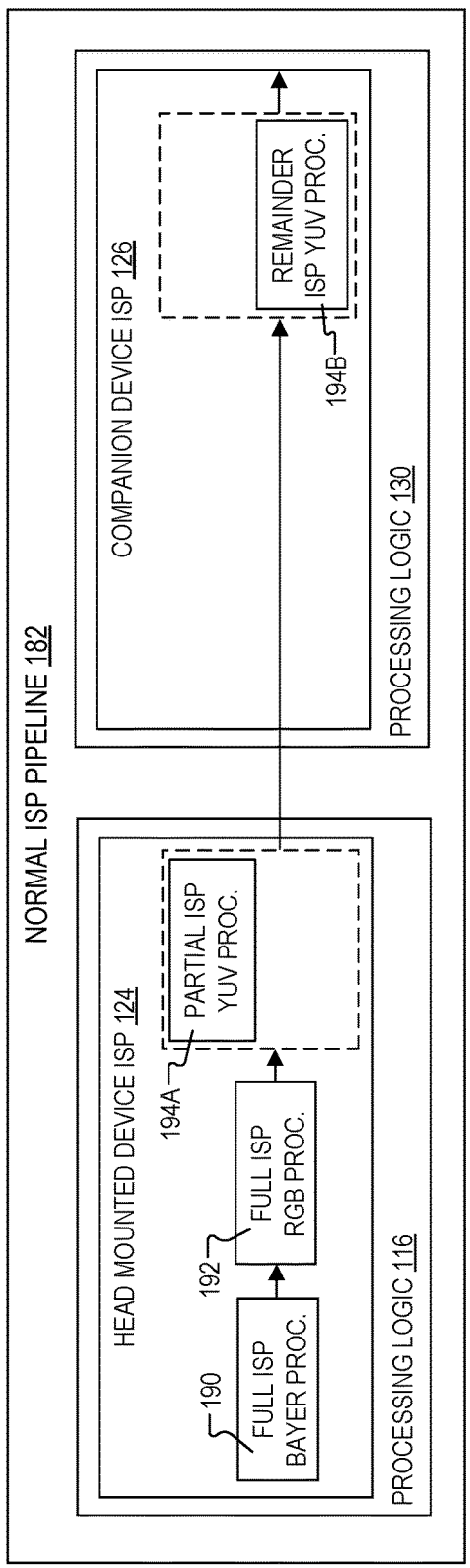
Figure 1C:
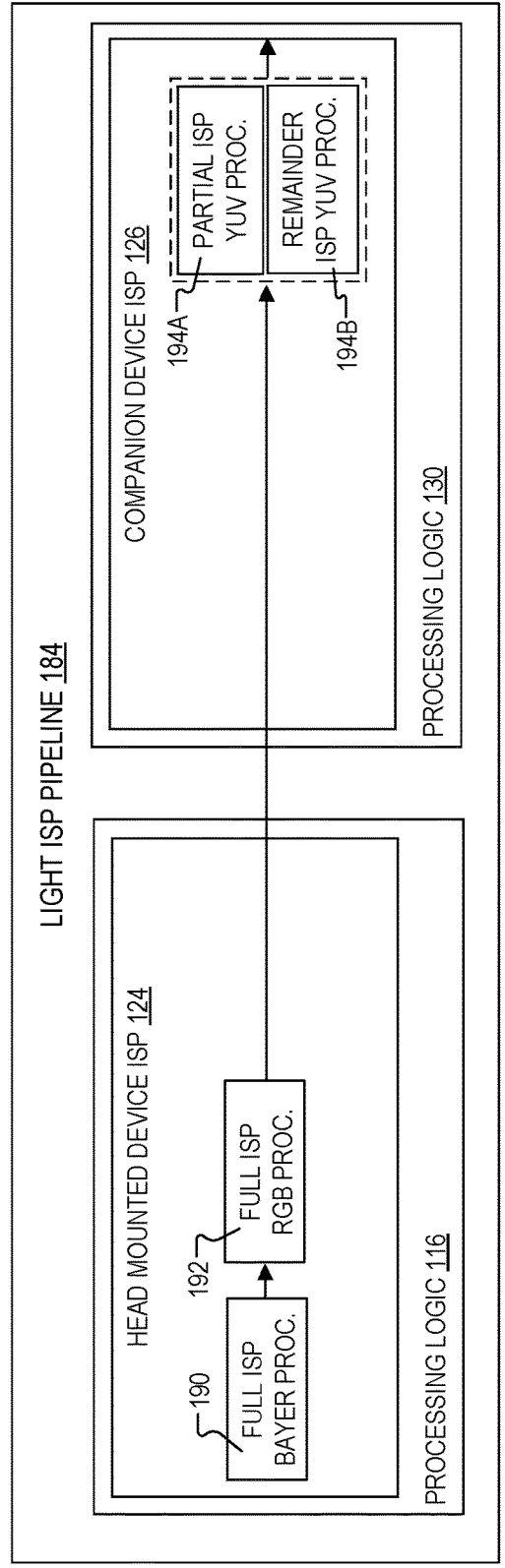
Figure 1D:
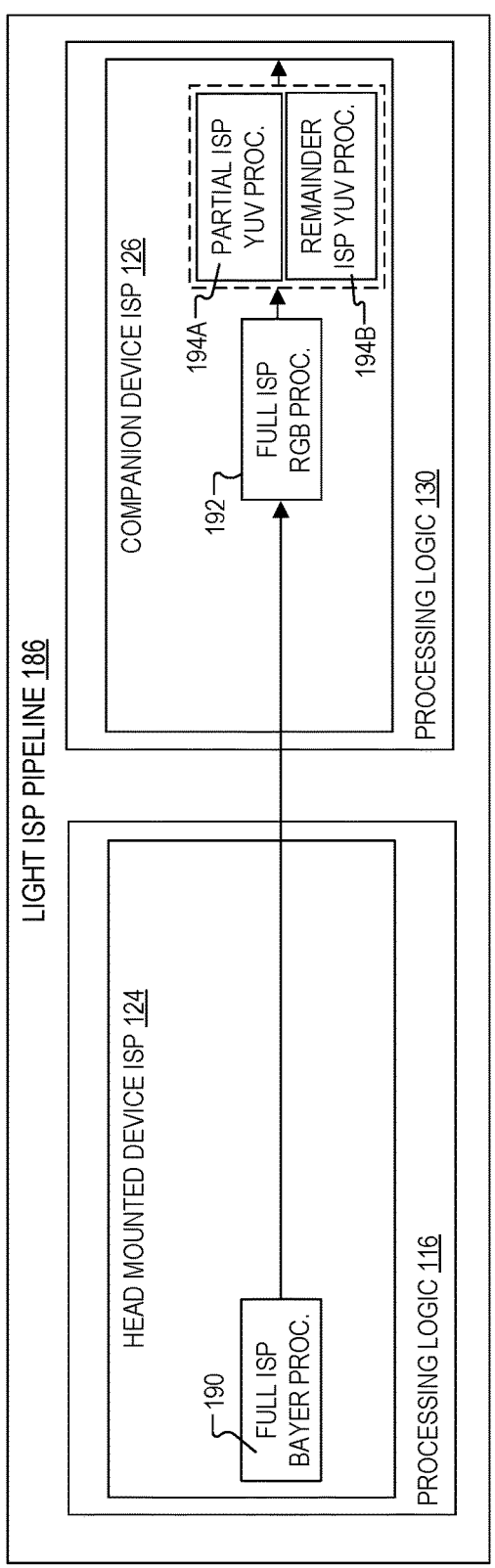
Figure 1D:
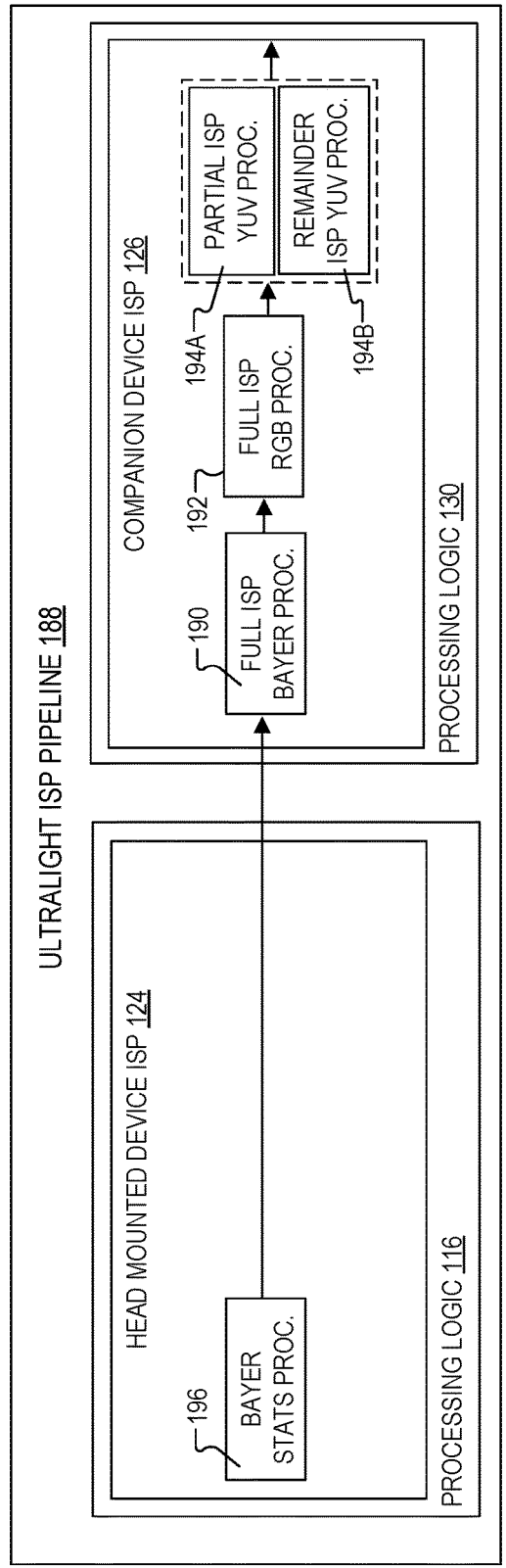

FIGS. 1A, 1B, 1C, and 1D illustrate example diagrams of distributed ISP systems, in accordance with aspects of the disclosure. FIG. 1A illustrates an example hardware diagram of distributed ISP system 100, FIG. 1B illustrates an example operational diagram of distributed ISP system 150, and FIGS. 1C and 1D illustrate example ISP pipeline configurations of distributed ISP system 180, in accordance with aspects of the disclosure. Distributed ISP system 100 includes a head-mounted device 101 that may be communicatively coupled to a computing device 102 through a network 103, in accordance with aspects of the disclosure. Head-mounted device 101 and computing device 102 are configured to use network 103 to transmit and receive various image data 105 to support distributed ISP operations, according to an embodiment. By offloading at least some ISP operations onto computing device 102, head-mounted device 101 may extend battery life and may enable faster image processing by relying on resources of computing device 102, for example. A head-mounted device, such as head-mounted device 101, is one type of smart device. In some contexts, head-mounted device 101 is also a head-mounted display (HMD) that is configured to provide artificial reality. Artificial reality is a form of reality that has been adjusted in some manner before presentation to the user, which may include, e.g., virtual reality (VR), augmented reality (AR), mixed reality (MR), hybrid reality, or some combination and/or derivative thereof.

Head-mounted device 101 includes an image sensor 106 that is configured as a scene facing camera, according to an embodiment. Image sensor 106 may be coupled to a frame 108 and may be configured to capture images of the environment in which head-mounted device 101 is directed, for example. Image sensor 106 may be a complementary metal-oxide-semiconductor (CMOS) image sensor or charge-coupled device (CCD) image sensor. Image sensor 106 may be configured to generate raw image data. The raw image data may be converted to Bayer (formatted) image data, RGB (red, green, blue) (formatted) image data and YUV (formatted) image data, and final (YUV) image data. An ISP may be configured to use a number of image processing engines to convert the raw image data to final image data, which may be displayed, compressed, or video-encoded (e.g., MP4, MPEG-4, AVI, WMV, etc.). Image sensor 106 is an example of one type of image sensor that may be included with head-mounted device 101. Head-mounted device 101 may include one or more additional image sensors that are oriented to receive light reflections from an eyebox region in order to determine an orientation of a user's eye(s).

Head-mounted device 101 includes a display 104 and a projector 107 to support in-field display functions, in accordance with aspects of the disclosure. Display 104 may include a waveguide system having one or more optical couplers and a waveguide coupled to lens assembly 112. The waveguide system may receive display data from projector 107 and may be configured to display the display data in front of a user's eye (in-field). Head-mounted device 101 may be configured to use display 104 to display images (e.g., post-processed final image data) captured by image sensor 106, according to an embodiment. Head-mounted device 101 may be configured to use display 104 to display a number of user interface (UI) elements (e.g., highlighting, rectangles, text) based on an analysis of image data captured by scene-oriented or eye-oriented image sensors, for example.

Lens assembly 112 is coupled or mounted to frame 108, for example, around a periphery of lens assembly 112. Lens assembly 112 may include a prescription optical layer matched to a particular user of head-mounted device 101 or may be non-prescription lens. Lens assembly 112 may include a number of optical layers, such as an illumination layer, a display layer (e.g., inclusive of display 104), a waveguide layer (e.g., to in couple light from the eyebox region), and/or a prescription layer, for example. Frame 108 may be coupled to arms 110A and 110B for securing head-mounted device 101 to the head of a user. The illustrated head-mounted device 101 is configured to be worn on or about a head of a wearer of head-mounted device 101.

Head-mounted device 101 includes a number of light sources 113 that are configured to emit light into the eyebox region (e.g., onto an eye), in an embodiment. Light sources 113 may be positioned at one or more of a variety of locations on frame 108 and may be oriented to selectively illuminate the eyebox region. Light sources 113 may include one or more of light emitting diodes (LEDs), photonic integrated circuit (PIC) based illuminators, micro light emitting diode (micro-LED), an edge emitting LED, a superluminescent diode (SLED), or vertical cavity surface emitting lasers (VCSELs).

Head-mounted device 101 includes a controller 114 communicatively coupled to image sensor 106, projector 107, and light sources 113, according to an embodiment. Controller 114 is configured to control the illumination timing of light sources 113, according to an embodiment. Controller 114 may be configured to synchronize operation of light sources 113 with image sensor 106 to enable image sensor 106 to capture reflections of light emitted by light sources 113. Controller 114 is coupled to image sensor 106 to receive image data (e.g., raw image data) captured by image sensor 106, according to an embodiment. Controller 114 may include processing logic 116 and one or more memories 118 to analyze image data received from one or more image sensors to: capture scene images, determine an orientation of one or more of a user's eyes, perform one or more eye tracking operations, and/or display or provide user interface elements in lens assembly 112, according to an embodiment. Controller 114 may include a wired and/or wireless data interface for sending and receiving data, one or more graphic processors, and one or more memories 118 for storing data and computer-executable instructions. Controller 114 and/or processing logic 116 may include circuitry, logic, instructions stored in a machine-readable storage medium, ASIC circuitry, FPGA circuitry, and/or one or more processors. In one embodiment, head-mounted device 101 may be configured to receive wired power. In one embodiment, head-mounted device 101 is configured to be powered by one or more batteries 120 that are coupled to controller 114 through, for example, power channel 121. In one embodiment, head-mounted device 101 may be configured to receive wired data including image data 105 or video via a wired communication channel. In one embodiment, head-mounted device 101 is configured to receive image data 105 through network 103 (e.g., a wireless communication channel).

Head-mounted device 101 includes an ISP 124 that is configured to work with ISP 126 (of computing device 102) to perform distributed ISP operations on image data captured by, for example, image sensor 106, in accordance with aspects of the disclosure. ISP 124 may be integrated into controller 114, processing logic 116, and/or memories 118. ISP 124 may be configured to perform partial ISP operations and may be configured to transmit the processed image data (e.g., image data 105) to computing device 102 for further ISP processing. For example, ISP 124 may be configured to convert raw image data into processed Bayer image data, may be configured to convert the Bayer image data into YUV image data, and may be configured to transmit the YUV image data (e.g., as image data 105) to computer device 102 for conversion into final image data 128. As another example, ISP 124 may be configured to convert raw image data into processed Bayer image data, and may be configured to transmit the processed Bayer image data (e.g., as image data 105) to computer device 102 for conversion into YUV image data and then into final image data 128. As another example, the ISP 124 may be configured to perform statistical processing of the raw image data and may be configured to transmit the raw image data to computing device 102 for conversion into processed Bayer image data, YUV image data, and then into final image data 128.

Head-mounted device 101 may be configured to distribute ISP operations to computing device 102 based on one or more events, in accordance with aspects of the disclosure. For example, controller 114 may be configured to monitor a voltage level or power level of one or more batteries 120 and may be configured to at least partially distribute ISP operations to computing device 102 to reduce the load on one or more batteries 120. Reducing the load of one or more batteries 120 may extend the duration that head-mounted device 101 may operate between battery charges. As another example, controller 114 may be configured to check for an established connected (e.g., over network 103) to computing device 102. Controller 114 may be configured to distribute at least some of the ISP operations to computing device 102 while a connection (e.g., wired or wireless) is established between head-mounted device 101 and computing device 102, for example. Controller 114 may be configured to distribute at least some of the ISP operations to computing device 102 based on whether a particular application or type of application is being operated (e.g., video conferencing, lowlight imaging, etc.).

Head-mounted device 101 may include a display 122, and an image sensor 127 positioned on or around a lens assembly 123 that is on, for example, a left side of frame 108. Display 122 may include similar features as display 104, and image sensor 127 may be configured to operate similarly to image sensor 106, and projector 125 may include similar features as projector 107, according to an embodiment. Lens assembly 123 may include similar features and/or layers as lens assembly 112, and controller 114 may be configured to control light sources 113, image sensors 106 and 127, and projectors 107 and 125.

Computing device 102 is configured to be communicatively coupled to head-mounted device 101 to receive image data 105 and to selectively perform one or more distributed ISP operations to generate final image data 128, in accordance with aspects of the disclosure. Computing device 102 is interchangeably referred to as a "companion device" to head-mounted device 101, and components of computing device 102 may be referred to as companion device components (e.g., companion device ISP 126). Computing device 102 includes processing logic 130, memory 132, and ISP 126, according to an embodiment. Processing logic 130 may include one or more processors, FPGA chips, ASICs, or the like. ISP 126 may include processing logic that is independent of processing logic 130, or ISP 126 may be at least partially integrated into or executed by processing logic 130. ISP 126 may be configured to perform a number of ISP operations to assist head-mounted device 101 in offloading ISP operations. In one implementation, computing device 102 receives image data 105 and ISP 126 is configured to convert processed Bayer image data (e.g., received as image data 105) into YUV image data and is configured to convert the YUV image data into final image data 128, using (for example) color conversion operation 133. In one implementation, computing device 102 receives image data 105 and ISP 126 is configured to convert YUV image data (e.g., received as image data 105) into final image data 128. Final image data 128 may then be displayed, encoded, or transmitted back to head-mounted device 101 as image data 105, according to various embodiments.

FIG. 1B illustrates a distributed ISP system 150 that is an operational representation of distributed ISP system 100, in accordance with aspects of the disclosure. Distributed ISP system 150 includes a head-mounted device ISP 124 and a companion device ISP 126 that are configured to perform distributed ISP operations, in accordance with aspects of the disclosure. Head-mounted device ISP 124 may be partially or fully operated by or executed with processing logic 116 of head-mounted device 101. Companion device ISP 126 may be partially or fully operated by or executed with processing logic 130 of computing device 102, according to an embodiment.

Head-mounted device ISP 124 may perform distributed ISP operations using one or more of a variety of techniques. Head-mounted device ISP 124 is configured to receive raw image data 156, and is configured to use Bayer processing engine 158 to generate processed Bayer image data 160. In one implementation, head-mounted device ISP 124 is configured to provide processed Bayer image data 160 to companion device ISP 126 for further processing and for the generating final image data 128. In another implementation, head-mounted device ISP 124 applies processed Bayer image data 160 to RGB processing engine 164 to generate YUV image data 166. Head-mounted device ISP 124 may then be configured to provide YUV image data 166 to companion device ISP 126 to enable the generation of final image data 128.

Companion device ISP 126 is configured to support distributed ISP operations using one or more of a variety of techniques. For example, companion device, ISP 126 may receive processed Bayer image data 160 and may apply processed Bayer image data 160 to RGB processing engine 164 to generate YUV image data 166. Companion device ISP 126 may generate YUV image data 166 or may receive YUV image data 166. Companion device ISP 126 may apply YUV image data 166 to YUV processing engine 168 to generate final image data 128. According to one implementation, the more ISP operations head-mounted device ISP 124 offloads to companion device ISP 126, the less ISP operations will drain one or more batteries 120 of head-mounted device 101.

In an ultra-lightweight distributed ISP operation, head-mounted device ISP 124 is configured to perform light processing of raw image data 156 to generate statistics 170, and head-mounted device ISP 124 provides raw image data 156 to companion device ISP 126 for Bayer processing, RGB processing, and YUV processing, according to an embodiment.

FIGS. 1C and 1D illustrate example diagrams of ISP pipelines for a distributed ISP system 180, which may be another view of distributed ISP system 150, in accordance with aspects of the disclosure. Distributed ISP system 180 is an alternative depiction of distributed ISP system 150, according to an embodiment. Distributed ISP system 180 includes a normal ISP pipeline 182, a light ISP pipeline 184, a light ISP pipeline 186, and an ultralight ISP pipeline 188, according to an embodiment.

Normal ISP pipeline 182 includes performing full ISP Bayer processing 190, full ISP RGB processing 192, and partial ISP YUV processing 194A with head-mounted device ISP 124, according to an embodiment. Normal ISP pipeline 182 may distribute remainder ISP YUV processing 194B to companion device ISP 126 to support a better image quality or processing-heavy applications (e.g., action recognition), according to an embodiment. Distributing remainder ISP YUV processing 194 to companion device 126 is advantageous because processing algorithms in this part may be optional and/or very power-consuming, according to an embodiment. Partial ISP YUV processing 194A may include one, two, or more of the operations of YUV image processing engine 240 (shown in FIG. 2C), according to an embodiment. Remainder ISP YUV processing 194B may include one, two, half, or more of the operations of YUV image processing engine 240 (shown in FIG. 2C), according to an embodiment. Partial ISP YUV processing 194A and remainder ISP YUV processing 194B may collectively be referred to as full ISP YUV processing, which may be performed solely on head-mounted device ISP 124.

Light ISP pipeline 184 includes performing full ISP Bayer processing 190 and full ISP RGB processing 192 with head-mounted device ISP 124. Light ISP pipeline 184 includes distributing full ISP YUV processing 194 to companion device ISP 126. In one embodiment, full ISP YUV processing is separated into partial YUV processing 194A and remainder YUV processing 194B. Light ISP pipeline 184 may be configured to perform partial YUV processing 194A with head-mounted device ISP 124 and may be configured to distribute remainder YUV processing 194B to companion device ISP 126, according to an embodiment. The division or separation of partial YUV processing 194A and remainder YUV processing 194B may be based on the type of application, running, may be based on connectivity between head-mounted device 101 and companion device 102, or may be based on other factors. For example, when companion device 102 or network 103 is not available and final image data 128 is requested, then full ISP YUV processing 194 may be completed in head-mounted device 102. As another example, if an application is running that demands heavy image processing (e.g., a video conferencing application), remainder YUV processing 194B may be distributed to head-mounted device 101.

Light ISP pipeline 186 includes performing full ISP Bayer processing 190 with head-mounted device ISP 124. Light ISP pipeline 186 includes distributing full ISP RGB processing 192 and full ISP YUV processing 194 to companion device ISP 126.

Ultralight ISP pipeline 188 includes performing light Bayer statistics processing 196 with head-mounted device ISP 124 to generate statistics for the raw image data. Ultralight ISP pipeline 188 includes distributing full ISP Bayer processing 190, full ISP RGB processing 192, and full ISP YUV processing 194 to companion device ISP 126.

Figure 2A:
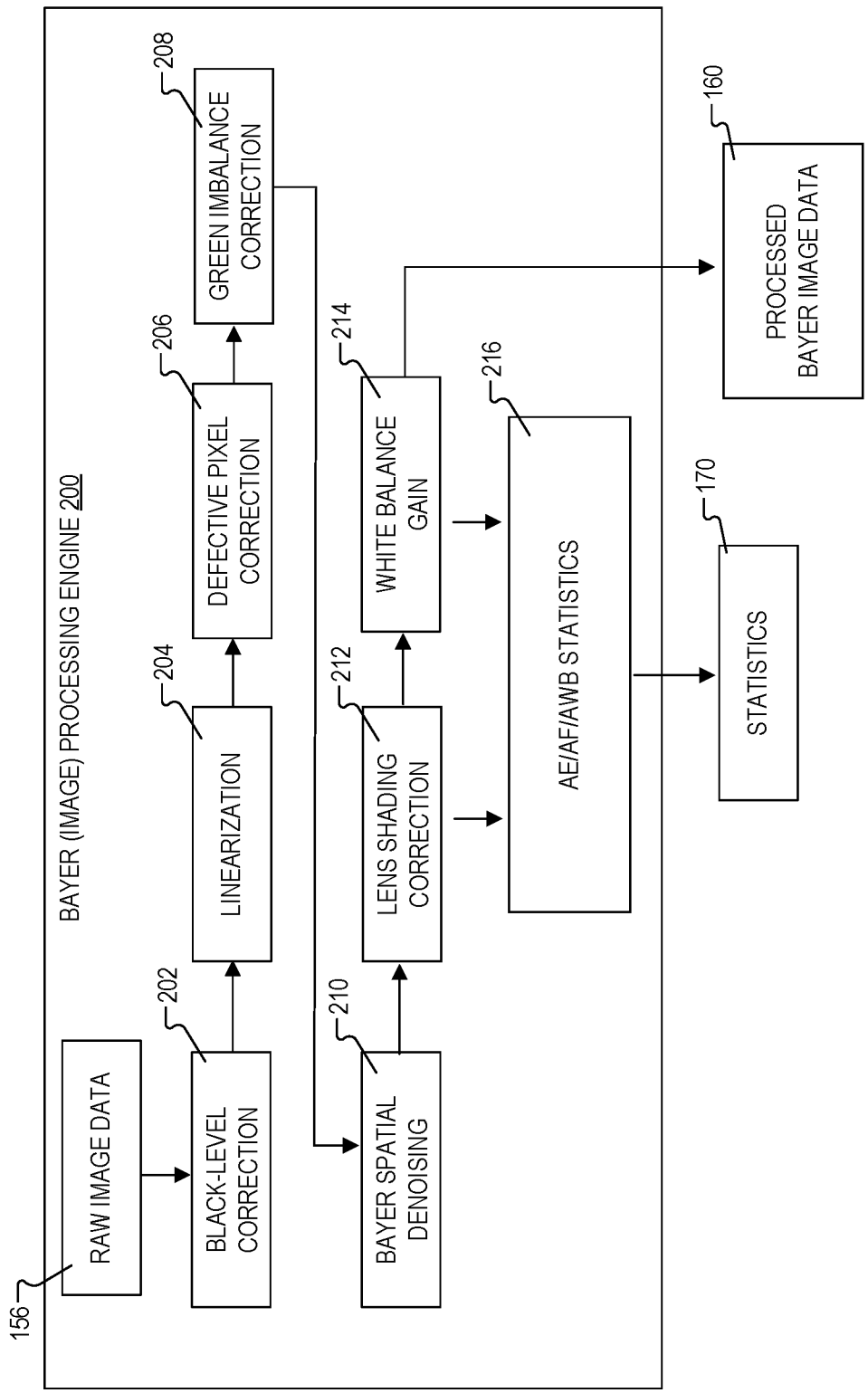
FIGS. 2A, 2B, and 2C illustrate example diagrams of image processing engines, in accordance with aspects of the disclosure.
Figure 2B:
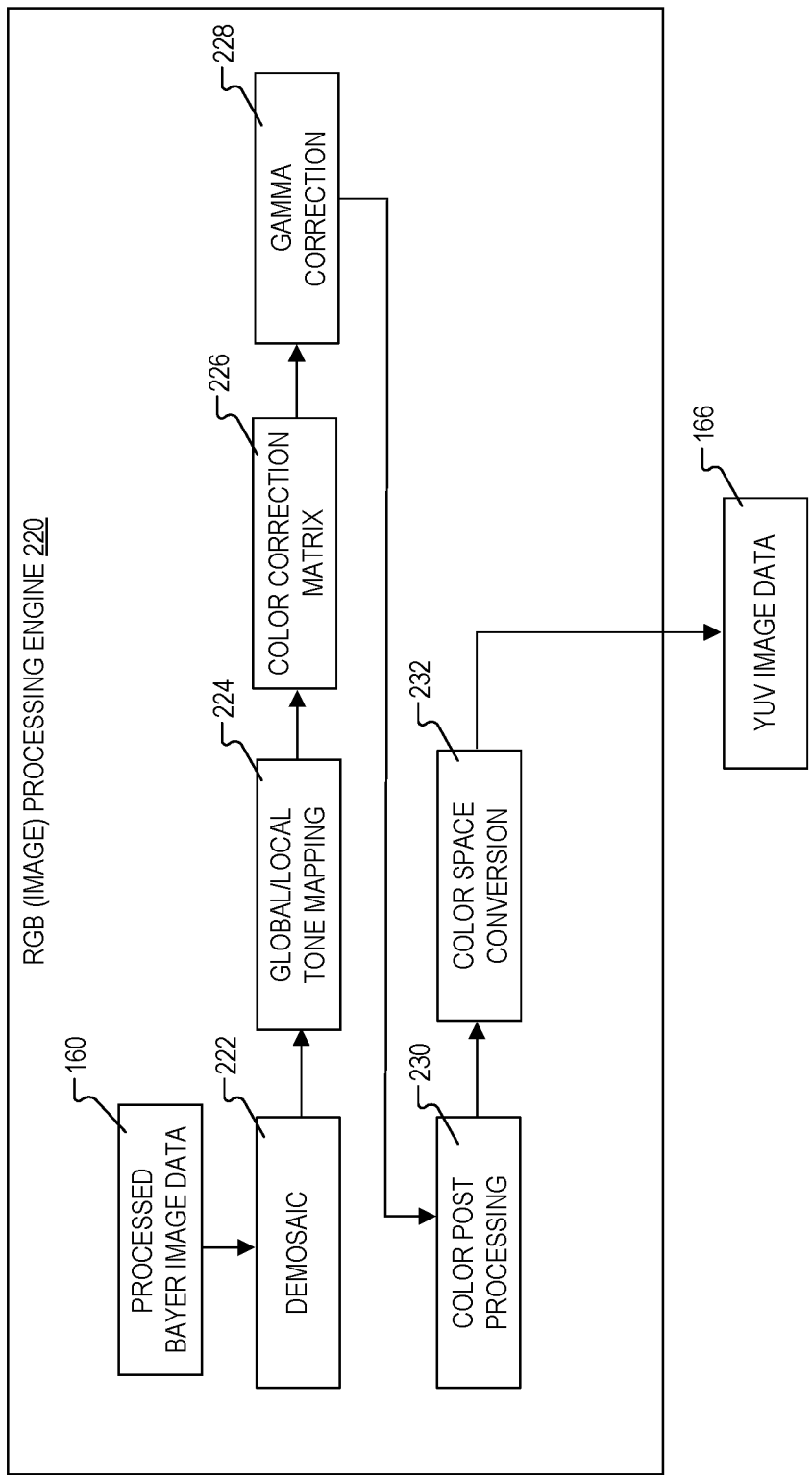
Figure 2C:
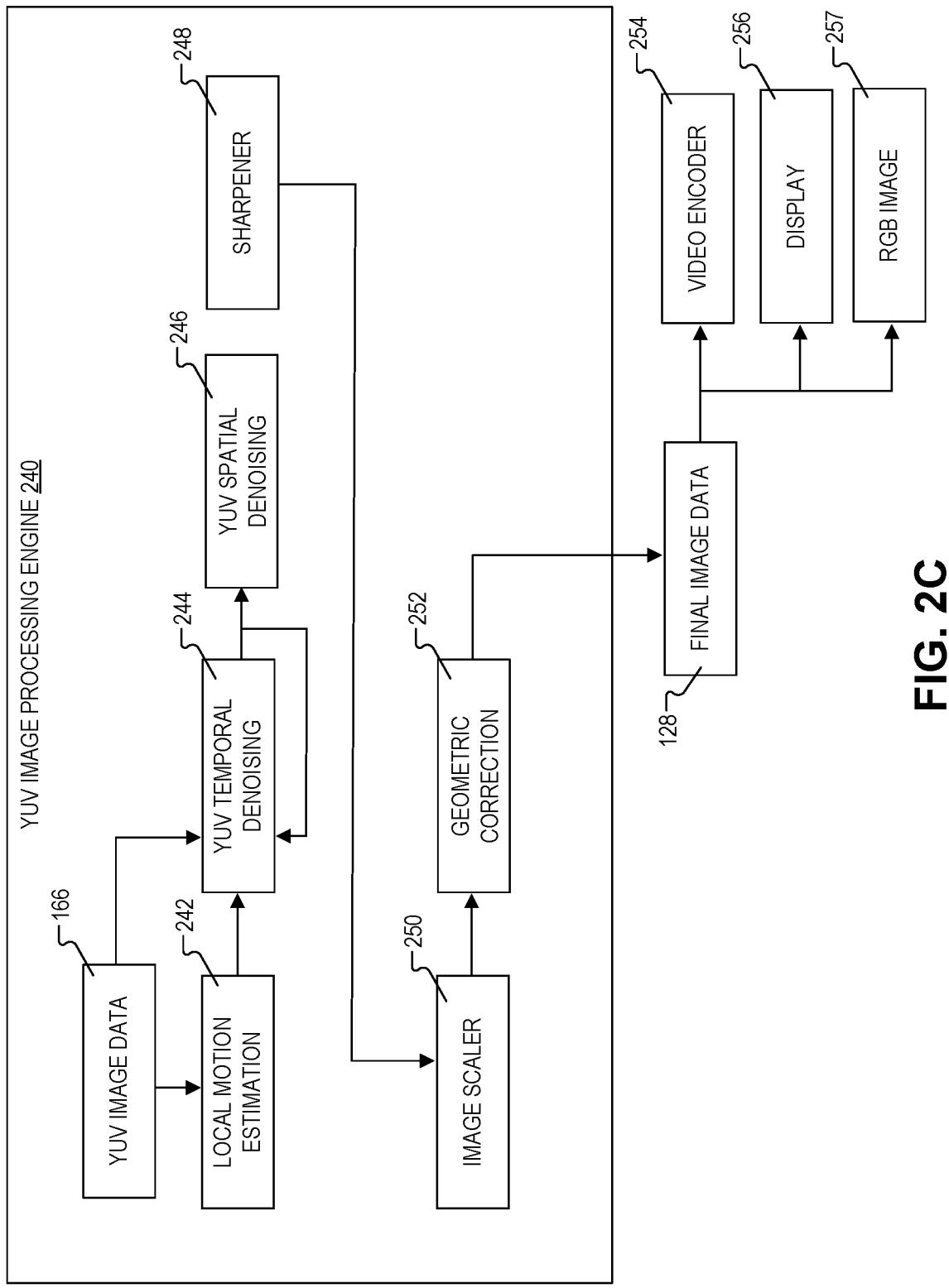

FIGS. 2A, 2B, and 2C illustrate example diagrams of more specific operation of the disclosed image processing engines, in accordance with aspects of the disclosure. FIG. 2A illustrates an example flow diagram of operations of Bayer (image) processing engine 200, in accordance with aspects of the disclosure. Bayer processing engine 200 may be configured to receive raw image data 156 as an input and may provide processed Bayer image data 160 and statistics 170 based on processing raw image data 156. At operation block 202, Bayer processing engine 200 performs a black-level correction operation, according to an embodiment. At operation block 204, Bayer processing engine 200 performs a linearization operation, according to an embodiment. At operation block 206, Bayer processing engine 200 performs a defective pixel correction operation, according to an embodiment. At operation block 208, Bayer processing engine 200 performs a green imbalance correction operation, according to an embodiment. At operation block 210, Bayer processing engine 200 performs a Bayer spatial denoising operation, according to an embodiment. At operation block 212, Bayer processing engine 200 performs a lens shading correction operation, according to an embodiment. At operation block 202, Bayer processing engine 200 performs a white balance gain operation, which generates the processed Bayer image data 160, according to an embodiment.

FIG. 2B illustrates an example flow diagram of operations of RGB (image) processing engine 220, in accordance with aspects of the disclosure. RGB processing engine 220 may be configured to receive processed Bayer image data 160 as an input and may provide YUV image data 166 based on performing operations on processed Bayer image data 160. At operation block 222, RGB processing engine 220 performs a demosaic operation, according to an embodiment. At operation block 224, RGB processing engine 220 performs a global/local tone mapping operation, according to an embodiment. At operation block 226, RGB processing engine 220 performs a color correction matrix operation, according to an embodiment. At operation block 228, RGB processing engine 220 performs a gamma correction operation, according to an embodiment. At operation block 230, RGB processing engine 220 performs a color post processing operation, according to an embodiment. At operation block 232, RGB processing engine 220 performs a color space conversion operation, which generates the processed YUV image data 166, according to an embodiment.

FIG. 2C illustrates an example flow diagram of operations of YUV (image) processing engine 240, in accordance with aspects of the disclosure. YUV processing engine 240 may be configured to receive YUV image data 166 as an input and may provide final image data 128 based on processing YUV image data 166. At operation block 242, YUV processing engine 240 performs a local motion estimation operation, according to an embodiment. At operation block 244, YUV processing engine 240 performs a YUV temporal denoising operation on YUV image data 166, local motion estimation data, and YUV temporal denoising data, according to an embodiment. At operation block 246, YUV processing engine 240 performs a YUV spatial denoising operation, according to an embodiment. At operation block 248, YUV processing engine 240 performs an image sharpener operation, according to an embodiment. At operation block 250, YUV processing engine 240 performs an image scaler operation, according to an embodiment. At operation block 252, YUV processing engine 240 performs a geometric correction operation, which generates the processed final image data 128, according to an embodiment. Final image data 128 may be provided to a video (or image) encoder 254, a display 256, or as an RGB image 257.

Figure 3:
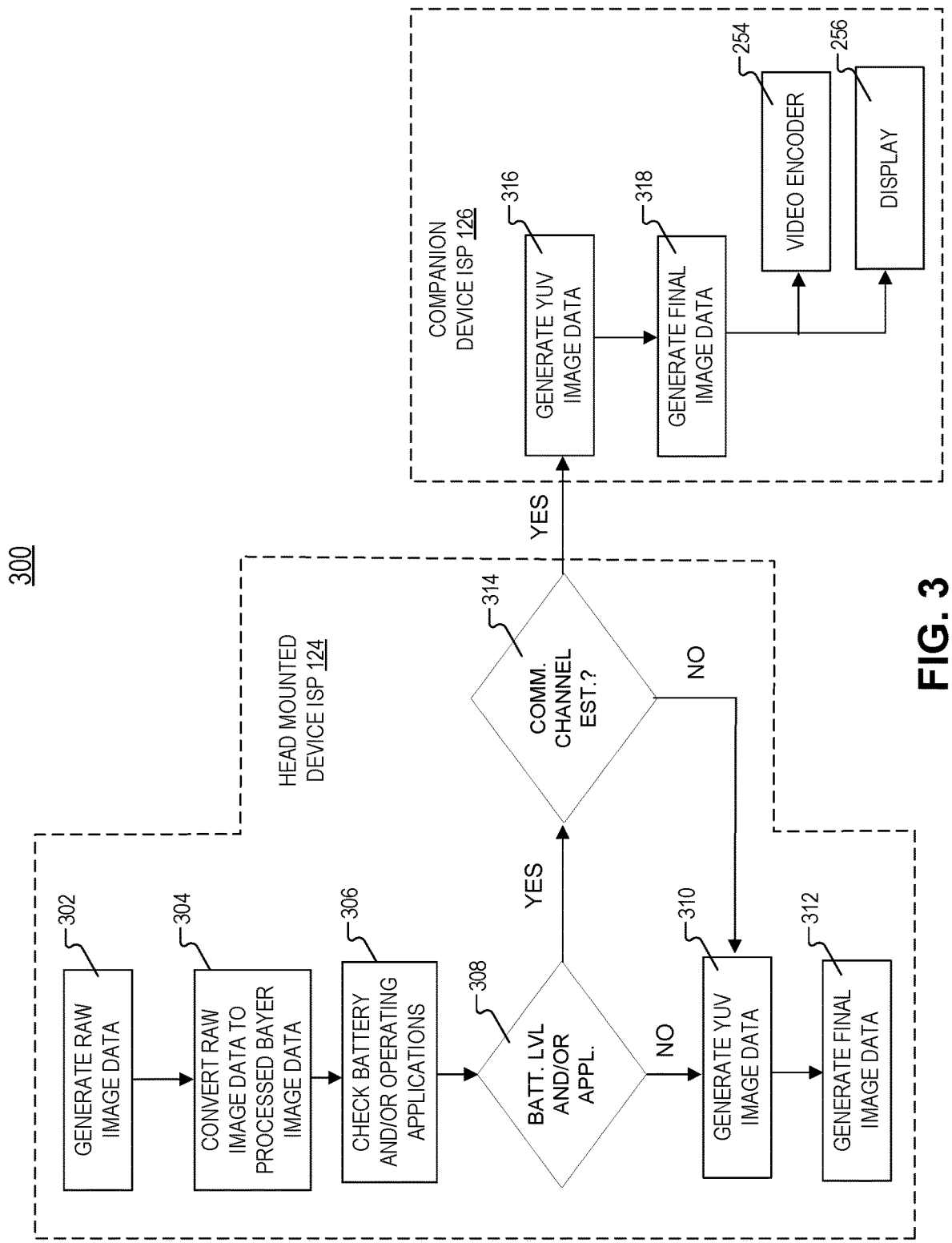
FIG. 3 illustrates an example flow diagram of a process of distributed ISP operations for a head-mounted device, in accordance with aspects of the disclosure.

FIG. 3 illustrates an example flow diagram of a process of distributing ISP operations for a head-mounted device, in accordance with aspects of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In operation block 302, process 300 generates raw image data, according to an embodiment. Operation block 302 proceeds to operation block 304, according to an embodiment.

In operation block 304, process 300 converts raw image data to processed Bayer image data, according to an embodiment. Operation block 304 proceeds to operation block 306, according to an embodiment.

In operation block 306, process 300 checks the battery (e.g., power or voltage level) and/or operating applications, according to an embodiment. Operation block 306 proceeds to operation block 308, according to an embodiment.

In operation block 308, process 300 determines if the battery is under a battery threshold (e.g., below a predetermined voltage level) and/or if a particular application or type of application is running, according to an embodiment. For example, for video-conferencing use case, process 300 may adopt an ultralight pipeline (e.g., ultralight ISP pipeline 188). For normal photo capture, process 300 may adopt normal pipeline (e.g., normal ISP pipeline 182) since normal photo capture typically does not consume much power compared with a long video capture. For lowlight photo capturing that uses complex and heavy additional computation, process 300 may adopt a light pipeline (e.g., light ISP pipeline 184 or 186). If the battery (e.g., voltage level) is above a threshold and/or if a particular application (e.g., video conference) is not running, operation block 308 proceeds to operation block 310, according to an embodiment. If the battery is below a threshold and/or if a particular application or type of application is running, operation block 308 proceeds to operation block 314, according to an embodiment.

In operation block 310, process 300 generates YUV image data with head-mounted device ISP 124, according to an embodiment. Operation block 310 proceeds to operation block 312, according to an embodiment.

In operation block 312, process 300 generates final image data with head-mounted device ISP 124, according to an embodiment.

In operation block 314, process 300 checks for a communication channel established (e.g., between head-mounted device 101 and computing device 102, according to an embodiment. If no, operation block 314 proceeds to operation block 310, according to an embodiment. If yes, operation block 314 proceeds to operation block 316, according to an embodiment.

In operation block 316, process 300 generates YUV image data with companion device ISP 126, according to an embodiment. Operation block 316 proceeds to operation block 318, according to an embodiment.

In operation block 318, process 300 generates final image data with companion device ISP 126, according to an embodiment. Operation block 318 may also include providing final image data to display 256 or to video encoder 254, according to an embodiment.

Although process 300 illustrates a battery check, battery threshold determination, and communications channel determination after Bayer image data has been generated, these operations may be performed after RGB image data has been generated, before Bayer image data has been generated, or at additional locations between other operations, in accordance with aspects of the disclosure.

Figure 4:
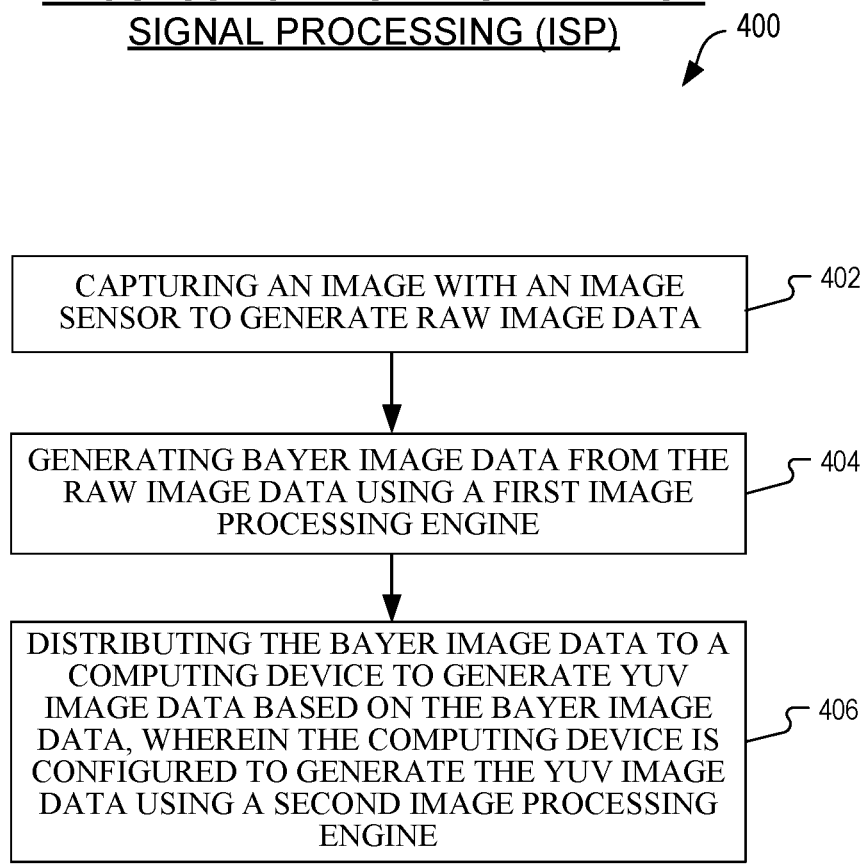
FIG. 4 illustrates an example flow diagram of a process of distributed ISP operations for a head-mounted device, in accordance with aspects of the disclosure.

FIG. 4 illustrates an example flow diagram of a process of distributing ISP operations for a head-mounted device, in accordance with aspects of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In operation block 402, process 400 includes capturing an image with an image sensor to generate raw image data, according to an embodiment. Operation block 402 proceeds to operation block 404, according to an embodiment.

In operation block 404, process 400 includes generating Bayer image data from the raw image data using a first image processing engine, according to an embodiment. Operation block 404 proceeds to operation block 406, according to an embodiment.

In operation block 406, process 400 includes distributing the Bayer image data to a computing device to generate YUV image data based on the Bayer image data, wherein the computing device is configured to generate the YUV image data using a second image processing engine, according to an embodiment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (IMD) connected to a host computer system, a standalone AMD, a mobile device or computing system, or any other hardware platform capable of providing artificial reality content to one or more viewers.

The term "processing logic" (e.g., 116) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., 118) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Network 103 may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I$^2$C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A distributed image signal processing (ISP) system for a head-mounted device comprising:
   a Bayer image processing engine configured to: (i) receive raw image data and (ii) generate Bayer image data from the raw image data, wherein the Bayer image processing engine is operated by first processing logic of the head-mounted device; and
   a controller integrated with or coupled to the first processing logic, wherein the controller is configured to:
      based at least in part on a power level of a battery or a status of an operating application of the head-mounted device, determine whether YUV image processing is to be performed by the first processing logic of the head-mounted device or is to be performed by a second processing logic of a computing device communicatively coupled to the head-mounted device; and
      if the YUV image processing is to be performed by the second processing logic, check if a communication channel to the computing device is established and if so, send the Bayer image data to the computing device for the YUV image processing.

2. The distributed ISP system of claim 1 further comprising:
   an RGB image processing engine configured to: (i) receive the Bayer image data and (ii) generate RGB image data from the Bayer image data, wherein:
   the image data is the RGB image data, and
   the RGB image processing engine is operated by the first processing logic or by the second processing logic.

3. The distributed ISP system of claim 1, wherein:
   the head-mounted device includes a-the battery, and
   a distribution of image processing engines of the distributed ISP system is configured to reduce a load on the battery.

4. The distributed ISP system of claim 1, wherein:
   the Bayer image processing engine is configured to provide statistics for the Bayer image data, and the statistics include at least one of auto-white-balance data, auto-exposure data, or auto-focus data.

5. The distributed ISP system of claim 1, wherein:
   the Bayer image processing engine is configured to perform image processing operations, and
   the image processing operations include one or more of: black-level correction, linearization, defective pixel correction, green imbalance correction, Bayer spatial denoising, lens shading correction, or white-balance gain.

6. The distributed ISP system of claim 1, wherein:
   the head-mounted device includes a YUV image processing engine configured to perform image processing operations, and
   the image processing operations include one or more of: local motion estimation, YUV temporal denoising, YUV spatial denoising, image sharpening, image scaling, or geometric correction.

7. The distributed ISP system of claim 1 further comprising:
   an RGB image processing engine, wherein:
      the RGB image processing engine is configured to perform image processing operations, and the image processing operations include one or more of: demosaic, global and local tone mapping, color correction matrix, gamma correction, color post-processing, or color space conversion.

8. The distributed ISP system of claim 1, wherein the computing device is configured to wirelessly receive the image data from the head-mounted device.

9. The distributed ISP system of claim 1, wherein the computing device is configured to video encode or display the YUV image data.

10. A distributed image signal processing (ISP) system comprising:
a head-mounted device having an image sensor and first processing logic,
wherein:
the image sensor is configured to generate raw image data, and
the first processing logic includes a Bayer image processing engine configured to receive the raw image data and configured to generate first image data having Bayer image data format, wherein based at least in part on a power level of a battery of the head-mounted device or a status of an operating application of the head-mounted device, the head-mounted device is to determine whether YUV image processing is to be performed on the head-mounted device or by a second processing logic located separately from the head-mounted device; and
a computing device communicatively coupled to the head-mounted device to receive image data if the YUV image processing is to be performed by the second processing logic and if a communication channel is established between the computing device and the head-mounted device, wherein the computing device includes the second processing logic, and wherein:
the second processing logic includes a YUV image processing engine configured to generate YUV image data based on the image data, and
the second image data has a YUV format.

11. The distributed ISP system of claim 10,
further comprising an RGB image processing engine to generate image data having an RGB image data format.

12. A method of distributed image signal processing (ISP) for a head-mounted device comprising:
capturing an image with an image sensor to generate raw image data;
generating Bayer image data from the raw image data using a first image processing engine;
based at least in part on a power level of a battery or a status of an operating application of the head-mounted device, checking whether a communication channel is established with a computing device, and if so, distributing the Bayer image data to a computing device to generate YUV image data based on the Bayer image data, wherein the computing device is configured to generate the YUV image data using a second image processing engine.

13. The method of claim 12, wherein the computing device is configured to:
(i) generate RGB image data from the Bayer image data and
(ii) generate the YUV image data from the RGB image data.

14. The method of claim 13, wherein the computing device is configured to generate the RGB data using a third image processing engine.

15. The method of claim 14, wherein the first image processing engine is a Bayer image processing engine, the second image processing engine is a YUV image processing engine, and the third image processing engine is an RGB image processing engine.

16. The method of claim 12 further comprising:
determining a power level of a battery of the head-mounted device; and
selectively distributing the Bayer image data to the computing device based on the power level, wherein the head-mounted device is configured to generate the YUV data while the Bayer image data is not distributed to the computing device.

17. The method of claim 16 further comprising:
reducing a power load on the battery by selectively distributing the Bayer image data.

18. The method of claim 12, wherein:
the first image processing engine is configured to provide statistics for the Bayer image data, and
the statistics include at least one of auto-white-balance data, auto-exposure data, or auto-focus data.

19. The method of claim 12, wherein:
the first image processing engine is a Bayer image processing engine that is configured to perform image processing operations, and
the image processing operations include one or more of: black-level correction, linearization, defective pixel correction, green imbalance correction, Bayer spatial denoising, lens shading correction, or white-balance gain.

* * * * *